United States Patent
Varghese et al.

(10) Patent No.: US 12,277,412 B2
(45) Date of Patent: Apr. 15, 2025

(54) PERSISTENT CONTEXT FOR REUSABLE PIPELINE COMPONENTS

(71) Applicant: Oracle International Corporation, Redwood Shores, CA (US)

(72) Inventors: Roy John Varghese, San Ramon, CA (US); Winston Jeeva Prakash, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/557,651

(22) Filed: Aug. 30, 2019

(65) Prior Publication Data

US 2020/0125344 A1    Apr. 23, 2020

Related U.S. Application Data

(60) Provisional application No. 62/747,799, filed on Oct. 19, 2018.

(51) Int. Cl.
| | | |
|---|---|---|
| *G06F 9/44* | (2018.01) | |
| *G06F 8/10* | (2018.01) | |
| *G06F 8/30* | (2018.01) | |
| *G06F 8/41* | (2018.01) | |

(Continued)

(52) U.S. Cl.
CPC .............. *G06F 8/4452* (2013.01); *G06F 8/10* (2013.01); *G06F 8/37* (2013.01); *G06F 8/71* (2013.01)

(58) Field of Classification Search
CPC . G06F 8/4453; G06F 8/10; G06F 8/37; G06F 8/71
See application file for complete search history.

(56) References Cited

U.S. PATENT DOCUMENTS

| | | | |
|---|---|---|---|
| 8,037,453 B1 * | 10/2011 | Zawadzki | ................. G06F 8/71 717/124 |
| 8,347,292 B2 | 1/2013 | Beckerle et al. | |
| 8,677,315 B1 | 3/2014 | Anderson et al. | |

(Continued)

OTHER PUBLICATIONS

U.S. Appl. No. 15/255,048, "Non-Final Office Action", mailed Mar. 7, 2018, 21 pages.

(Continued)

*Primary Examiner* — S. Sough
*Assistant Examiner* — Mohammad H Kabir
(74) *Attorney, Agent, or Firm* — Kilpatrick Townsend & Stockton LLP

(57) ABSTRACT

Techniques are provided for managing and isolating build process pipelines. The system can encapsulate all the information needed for each build process step in a build context structure, which may be accessible to the build process step. Each build process step can receive input from the build context, and can generate a child build context as output. Accordingly, the build pipeline may be parallelized, duplicated, and/or virtualized securely and automatically, and the build context can carry, organize, and isolate data for each task. The build context from each step can also be stored and subsequently inspected, e.g. for problem-solving. A computing device can execute a first build step configured to generate the build context including a plurality of output objects. The computing device further executes a second build step based on the build context, which is accessible to the second build step but isolated from other processes.

13 Claims, 9 Drawing Sheets

(51) Int. Cl.
*G06F 8/71* (2018.01)
*G06F 9/455* (2018.01)

(56) References Cited

U.S. PATENT DOCUMENTS

| | | | |
|---|---|---|---|
| 9,021,458 B1 | 4/2015 | Jacob et al. | |
| 9,207,931 B2 | 12/2015 | Fox et al. | |
| 9,696,971 B1 | 7/2017 | Wierda et al. | |
| 10,437,585 B2 | 10/2019 | Mills | |
| 2002/0087888 A1 | 7/2002 | Yamakawa et al. | |
| 2008/0209423 A1 | 8/2008 | Hirai | |
| 2010/0299650 A1 | 11/2010 | Abrahamsen et al. | |
| 2012/0060165 A1 | 3/2012 | Clarke | |
| 2012/0246616 A1* | 9/2012 | Frontiero | G06F 8/71 717/121 |
| 2013/0091350 A1 | 4/2013 | Gluck | |
| 2013/0174124 A1* | 7/2013 | Watters | G06F 8/71 717/122 |
| 2013/0219361 A1 | 8/2013 | Fiebig et al. | |
| 2014/0089896 A1 | 3/2014 | Mansour et al. | |
| 2014/0278623 A1 | 9/2014 | Martinez et al. | |
| 2015/0106790 A1 | 4/2015 | Bigwood et al. | |
| 2015/0220426 A1 | 8/2015 | Spektor et al. | |
| 2015/0331689 A1* | 11/2015 | Blahaerath | G06F 8/30 717/121 |
| 2016/0364210 A1 | 12/2016 | Davidov et al. | |
| 2017/0010889 A1 | 1/2017 | Spektor et al. | |
| 2017/0054798 A1 | 2/2017 | Katsuno et al. | |
| 2017/0115976 A1 | 4/2017 | Mills | |
| 2018/0314517 A1* | 11/2018 | Iwanir | G06F 21/563 |
| 2019/0294528 A1* | 9/2019 | Avisror | G06F 11/3688 |

OTHER PUBLICATIONS

U.S. Appl. No. 15/255,048, "Final Office Action", mailed Jul. 12, 2018, 23 pages.
U.S. Appl. No. 15/255,048, "Non-Final Office Action", mailed Feb. 6, 2019, 23 pages.
U.S. Appl. No. 15/255,048, "Notice of Allowance", mailed Jun. 3, 2019, 10 pages.
Humble et al., "Continuous Delivery", Addison-Wesley, 2011, 497 pages.
U.S. Appl. No. 16/552,777, Notice of Allowance, mailed on Oct. 7, 2020, 11 pages.
Locklindt et al., "How Blockchain Could Be Implemented for Exchanging Documentation in the Shipping Industry", 2018, 132 pages.
Zhu et al., "PPMLT: A Pipeline Based Processing Model of Long Transactions", 2011 IEEE International Conference on Advanced Information Networking and Applications, 2011, pp. 200-207.
U.S. Appl. No. 16/552,777, "Non-Final Office Action", mailed Jun. 10, 2020, 18 pages.

* cited by examiner

PERSISTENT CONTEXT FOR REUSABLE PIPELINE COMPONENTS

CROSS-REFERENCE TO RELATED APPLICATION

This application claims the benefit and priority under 35 U.S.C. § 119(e) to U.S. Provisional Application No. 62/747,799, filed Oct. 19, 2018, entitled "PERSISTENT CONTEXT FOR REUSABLE PIPELINE COMPONENTS," the entire contents of which is incorporated herein by reference for all purposes. This application is also related to U.S. application Ser. No. 15/255,048, filed Sep. 1, 2016, entitled "MANAGING HIGHLY SCALABLE CONTINUOUS DELIVERY PIPELINES," the entire contents of which is hereby incorporated by reference as if fully set forth herein.

BACKGROUND OF THE DISCLOSURE

Continuous Delivery (CD) and Continuous Integration (CI) are processes within software engineering where software is automatically compiled, tested, and deployed as part of a coordinated process on a very frequent basis. CI and CD can develop a software product from source code, through compilation and testing into deployment, promotion, approvals, and delivery. Using systems such as Hudson, Jenkins, or TeamCity, CD proceeds by chaining, or stringing together, a series of build steps, which perform individual software production jobs or tasks, into a build pipeline orchestrated to develop the software product.

In common with many other similar process orchestrations (such as service-oriented architecture (SOA)), the CD server manages each running instance of the process pipeline, receiving results from a respective task before deciding what to do next.

A build pipeline is a chained series of build steps, where each step takes input from the output of one or more immediately preceding steps. Each build step (traditionally known as a "builder" in Hudson) is a specialized task that operates on a set of inputs to produce one or more outputs and/or side-effects. These inputs may be statically configured as part of the definition of the build step, or they may be variables whose values are passed in as build parameters.

However, build steps with statically configured inputs may be inherently unusable in a pipeline. For example, such static configurations may violate the central tenet of a pipeline, namely, that each build step of a pipeline should only use the output of the steps immediately preceding it in the pipeline. There are a number of ways the pipeline breaks down. First, reliance on external input makes the pipeline's successful completion contingent on an external source's reliability, when the external source can potentially be modified by another pipeline or another build being processed in the same pipeline. Second, reliance on output from steps further upstream in the pipeline creates a 'bridge' between different parts of the pipeline, bypassing any subsequent modifications of the inputs in the bridged portion of the pipeline. Finally, parallel execution is not possible. The efficiency of a pipeline depends on the number of builds that can be simultaneously processed. If a task must exit a long pipeline before other tasks can be started, this may drastically increase the delivery time, depending on the execution time and length of the pipeline. Some pipelines may require 'work flow breaks' between tasks, resulting in indeterminate delays or even wrong results.

BRIEF SUMMARY OF THE DISCLOSURE

A computing device can execute a first build step configured to generate the build context including a plurality of output objects. The computing device further executes a second build step based on the build context, which is accessible to the second build step but isolated from other processes.

DETAILED DESCRIPTION OF THE DISCLOSURE

Figure 1A:
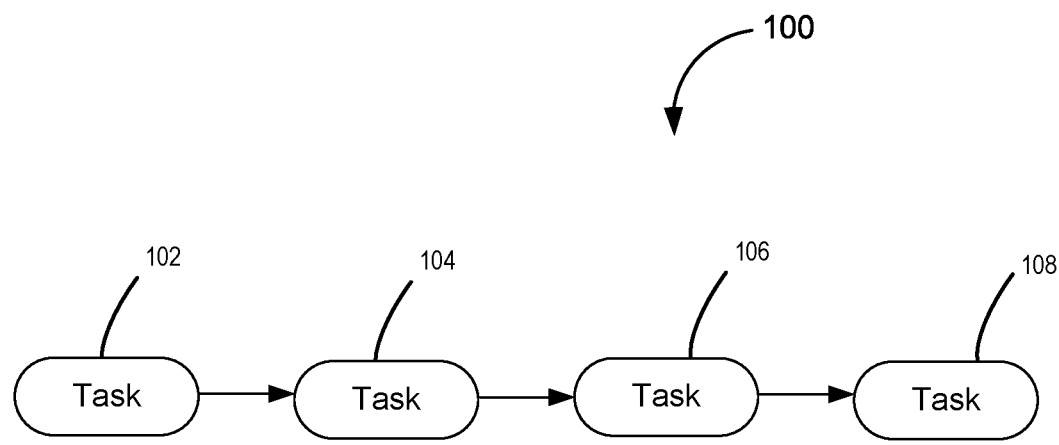
FIG. 1A illustrates an example build pipeline schematically.

Techniques are provided for managing and isolating build process pipelines. The disclosed system improves over conventional build pipelines by encapsulating the information needed for each build process step within a structure referred to as a build context. This encapsulated information may be accessible to the build process step via the build context. Each build process step can receive input from the build context, and can generate a child build context as output. Accordingly, the build pipeline may be parallelized, duplicated, and/or virtualized securely and automatically, and the build context can carry, organize, and isolate data for each task. The build context from each step can also be stored in a record and subsequently inspected, e.g. by a developer for problem-solving.

Continuous Delivery (CD), as used herein, refers to a process within software engineering where software is automatically compiled, tested, and deployed as part of an orchestrated process on a very frequent basis. A CD process is typically organized around a build pipeline. A build pipeline, as used herein, refers to a CD process constructed from a series of jobs that each carry out the individual tasks required to take the software from source code to running application or shippable artifact. Typical Continuous Integration/Continuous Delivery (CI/CD) tools include Hudson and Jenkins. This process is also sometimes referred to by the related terms of build automation and continuous deployment.

A typical example application of CI/CD is a build pipeline that builds and deploys a software application based on source code checked out from a source code repository, such as Git or another similar repository. For example, suppose a team of developers of an enterprise's accounting database client follows the practice of CI/CD in order to incorporate updates, new features, and patches into their existing software product. The team must incorporate all changes into a single version of the source code, build the code into an application, test the build, and push the latest version to customers or other users, for example, via the organization's intranet or another network. The team could accomplish this using CI/CD to automate these tasks within a build pipeline. In this example, typical jobs within the build pipeline would include checking the source code out from the repository, running a build automation tool such as Apache Maven to build the application, testing the build, and deploying the built application, for example to a Weblogic container. Using the disclosed system and methods, the team could improve over conventional CI/CD by encapsulating each of these build steps so there is no danger of interference among the steps, even if multiple instances of the build steps execute in parallel. This allows the team to parallelize the build pipeline, thereby using the build cluster's resources more efficiently.

In particular, the disclosed system and methods provide isolated containers, referred to as build contexts, for each job in the build pipeline to the build workers. The system thereby makes the jobs modular and parallelizable in an automated, scalable, and robust way. For example, multiple tasks (belonging either to a single pipeline instance, or to different pipelines) can coexist on one computing device and/or virtual machine, without interference. Such tasks can even share a single storage area (e.g., in a file system such as NFS, a local storage drive, etc.), and avoid overwriting one another, since the jobs are isolated from each other in separate build contexts. In another example, by utilizing build contexts, the disclosed system and methods can parallelize jobs even within a single pipeline instance.

FIG. 1A illustrates an example build pipeline 100 schematically. In this example, build pipeline 100 comprises various tasks, also referred to as build steps 102-108 or jobs. A build step, as used herein, refers to individual processes within a CD system, such as compiling from source, running tests, or deploying an application. The build steps 102-108 can be chained together, so that the output of one task, such as build step 102, is the input of the subsequent task, such as build step 104. Build pipeline 100 can orchestrate the jobs by chaining them together, controlling the ordering of job execution, and managing branching and associated functions such as error recovery.

In this example, build step 102 may be an initial step, also referred to as a leading step or trigger step, that takes input from a pipeline initiation action such as user input or an automated process (e.g., a Git commit event), rather than from a preceding step, as disclosed herein. Likewise, build step 108 may be a terminal step, that produces a build binary but does not pass output to a subsequent build step. A build, as used herein, refers to an instance of a job execution in the build pipeline (i.e., the results thereof).

Figure 1B:
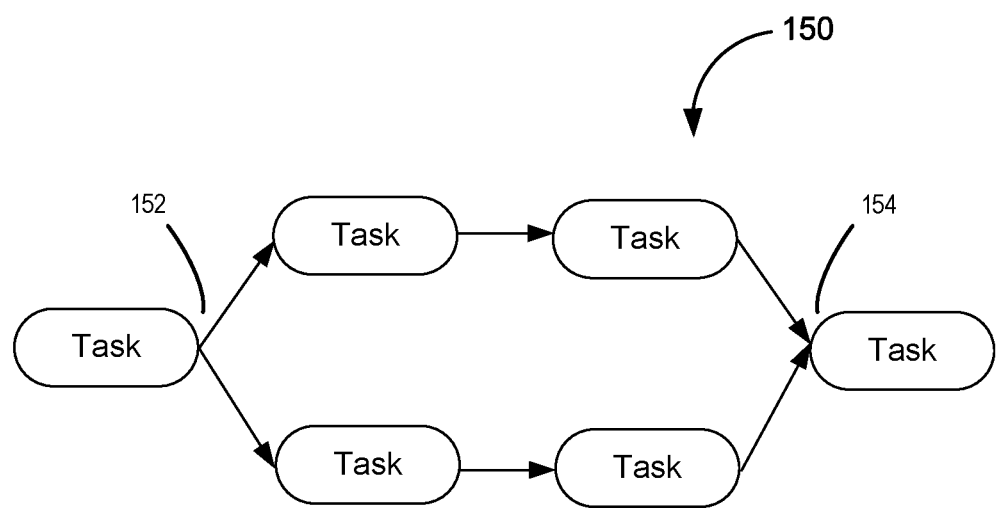
FIG. 1B illustrates an example build pipeline with a fork and join.

FIG. 1B illustrates an example build pipeline 150 with a fork 152 and join 154. A fork, as used herein, refers to an event 152 within a pipeline where a single build path is split into two or more parallel paths to allow for concurrent asynchronous execution of the following steps in the pipeline. In various embodiments, the steps following a fork 152 can execute on the same build worker or on different workers, in parallel, or sequentially. A join, as used herein, refers to an event 154 within a pipeline where two or more parallel execution streams recombine to a single stream. Generally, a join 154 will wait until all of the inbound jobs are complete before progressing to the next step in the pipeline, and will receive the results of all these inbound jobs. A fork may also be referred to as a fan-out, and a join may also be referred to as a fan-in.

Creating a reliable CI/CD pipeline, such as build pipeline 100, can be a difficult or labor-intensive task. Certain existing CI tools have attempted to solve this problem by providing a 'marketplace' of user-defined steps that can be dropped into a pipeline. However, while such conventional approaches address reusability of purpose, reusability itself may be only a fraction of the cost of installing and maintaining the step in the pipeline. A user typically must expend significant additional effort to provide the inputs to the build step, and to manage any outputs and/or side-effects from the step. Users of such conventional CI/CD systems may spend significant time designing and managing these channels; in fact, a reliable system that synchronizes all these inputs and outputs while maintaining high throughput of a pipeline is often a small project in itself. Moreover, conventionally the user must store input and output data for a build pipeline, and retrieve this data in order to use it.

The disclosed system and methods can improve over such conventional approaches to build pipeline modularity by automating them, and making them more robust, secure, seamless, and parallelizable. In particular, conventional approaches are typically limited to parallelizing the build pipeline by distributing multiple instances of the pipeline over different build workers, but cannot parallelize tasks within a single pipeline instance. By contrast, the disclosed system and methods can execute multiple build steps within the same build pipeline instance, on multiple build workers in parallel. Using the disclosed build contexts, parallel tasks (such as different branches of a pipeline fork as in the example of FIG. 1B, serial steps of a single build pipeline, or tasks belonging to separate instances of a single pipeline, or tasks belonging to different pipelines) can share a storage area or filesystem without overwriting each other.

Figure 2:
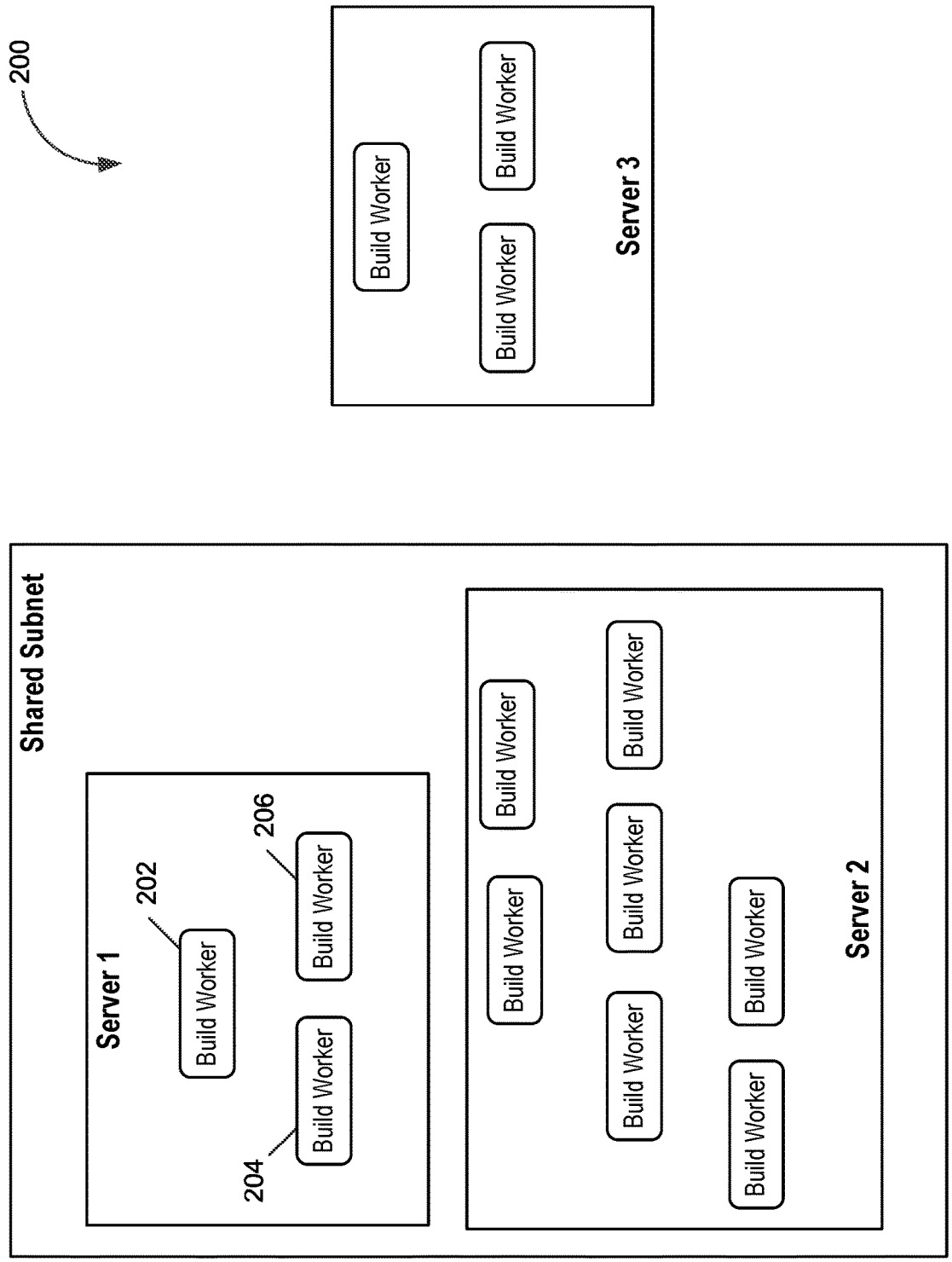
FIG. 2 is a block diagram of a continuous delivery build cluster topology in one embodiment according to the present disclosure.

FIG. 2 is a block diagram of a continuous delivery build cluster topology 200 in one embodiment according to the present disclosure. As illustrated, topology 200 includes server 1 and server 2 on a shared subnet, as well as server 3. In an embodiment, there can be a firewall between the shared subnet and server 3. Each of server 1, server 2, and server 3 may represent individual physical and/or virtual machines. Each server includes one or more build workers disposed to accept a job. For example, each build worker is part of a pool including multiple build workers for a respective server. Build workers may also be referred to herein as computing devices or slaves. Each worker may process a step in the pipeline processing, e.g. in parallel.

In an example, server 1, one build worker 202 may process one job, while one or more other build workers 204, 206 execute other jobs in parallel. Each build worker may be considered a node. One or more build workers may be arranged in a hierarchical manner, according to predetermined relationships, or the like. In some examples, server 1 and server 2 may exist within the same subnet (from an accessibility point of view), while server 3 may not be accessible to server 1 or server 2, e.g. because server 3 is behind a firewall. Additionally, build worker 206 may send its completed job and status to one of the build workers of server 3, while build worker 204 may send its completed job and status to one of the build workers of server 2. The recipient build workers can then proceed to process the next job or pass the job and status along to other build workers in the pipeline.

In various embodiments, build cluster topology 200 may include physical servers, build workers, VMs, and/or containers allowing multiple VMs per node. All of these may be referred to generically herein as computing devices.

Figure 3:
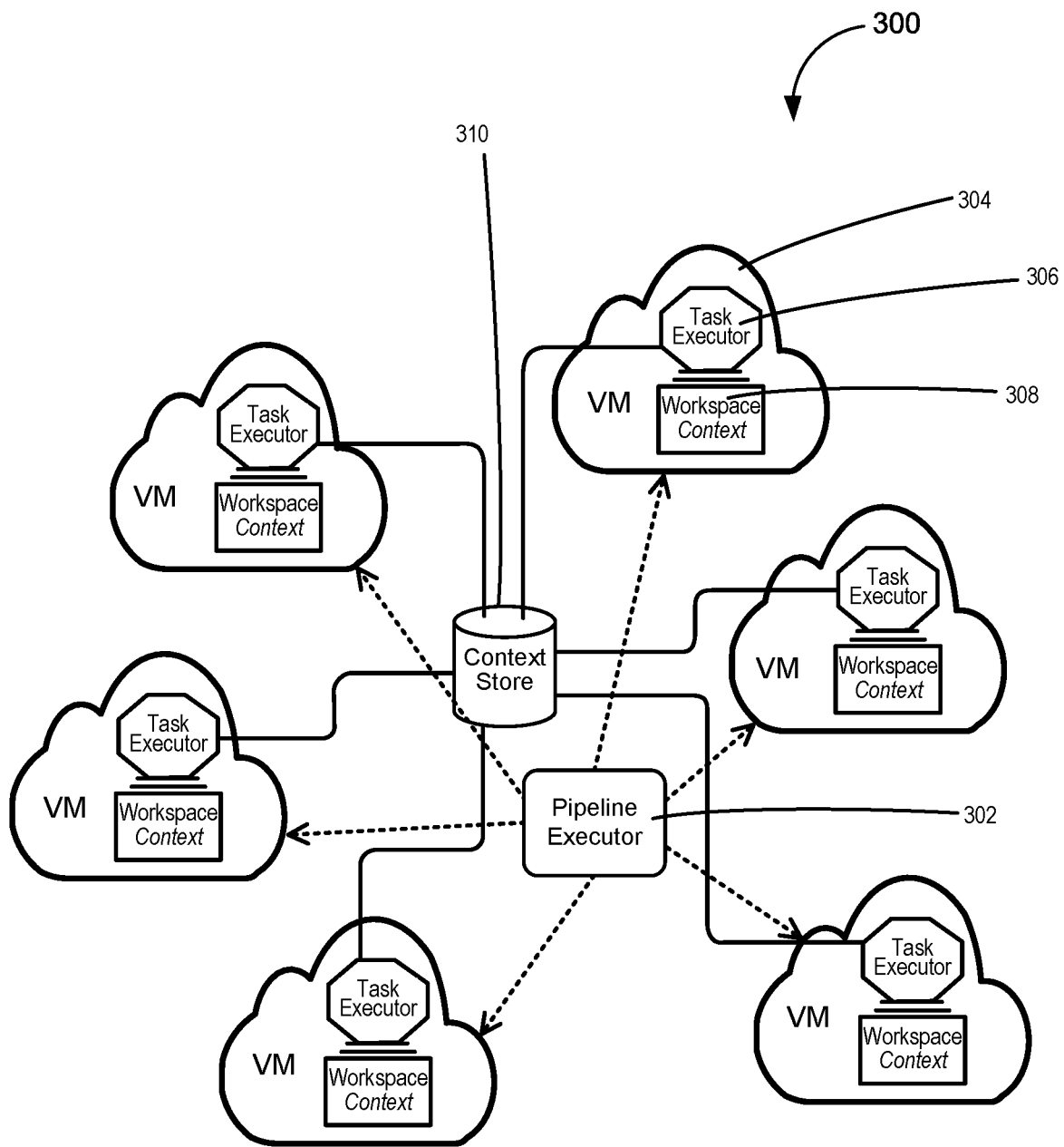
FIG. 3 illustrates example tasks of a build pipeline executing in various executors and utilizing encapsulation via build contexts, according to embodiments of the present disclosure.

FIG. 3 illustrates tasks of an example build pipeline 300 executing in various executors and utilizing encapsulation via build contexts, according to embodiments of the present disclosure. The executors may be part of a build topology, such as build topology 200 of the example of FIG. 2, which may include multiple servers and/or build workers. The build topology may also include multiple clusters, as in the example of FIG. 2. Execution of build pipeline 300 can be managed by pipeline executor 302, which can send individual jobs, or parallel copies thereof, to various build worker nodes for execution. In an embodiment, pipeline executor 302 and context store 310 can communicate with many servers in the cluster. Multiple instances of the same image may execute on different servers.

Tasks are executed in various Virtual Machine (VM) executors, such as VM 304 executing task executor 306. In addition to VMs, the system may execute build jobs on physical servers, build workers, and/or containers, which may be referred to generically as computing devices or build workers. In some embodiments, VMs can be started and stopped, execution can be paused, etc. Pipeline executor 302 can manage execution of each build pipeline instance on the VMs or other workers. In particular, upon completion of a build task on one of the workers, the pipeline executor 302 may wait to execute the next task if the next step has a dependency on another input, such as a parallel build task, or user input. Pipeline executor 302 may further combine results from multiple build steps executing on different workers into a single result.

In this example, workspaces such as workspace 308 on VM 304 can execute individual build steps, and can maintain local copies of build contexts, which can include all the input and output data needed by the local jobs. In some embodiments, such local copies of the build contexts may contain copies of data from parent build contexts, from which the build contexts are descended. Alternatively, the local build contexts may instead have functionality that enables them to access the parent build context data as if they owned the data, without actually containing copies of the parent build context data.

Each build worker, such as VM 304, can send its build context to context store 310, which can store records of the individual build contexts output by each node. Accordingly, when a child build context needs to access data from one of its parent build contexts in the lookup hierarchy, it may retrieve the data from the context store 310. Moreover, copies of the build contexts output by each task or step of each instance of the build pipeline may be available from context store 310 for later inspection, for example for debugging purposes. Alternatively, an entire hierarchy of parent and child build contexts from a single pipeline may be stored together in the context store, as will be described in the example of FIG. 4 below. Context store 310 may send a copy of the appropriate build context to each worker while the worker executes a task.

In an embodiment, such stored records can function as checkpoints, allowing an arbitrary time delay between successive build steps. For example, a stored build context may be picked up at a later time, and the build pipeline may continue after a delay, such as a few hours, days, weeks, or even years. In another example, a portion of the build pipeline, such as the last several steps, may be repeated, using a stored build context as a checkpoint.

Figure 4:
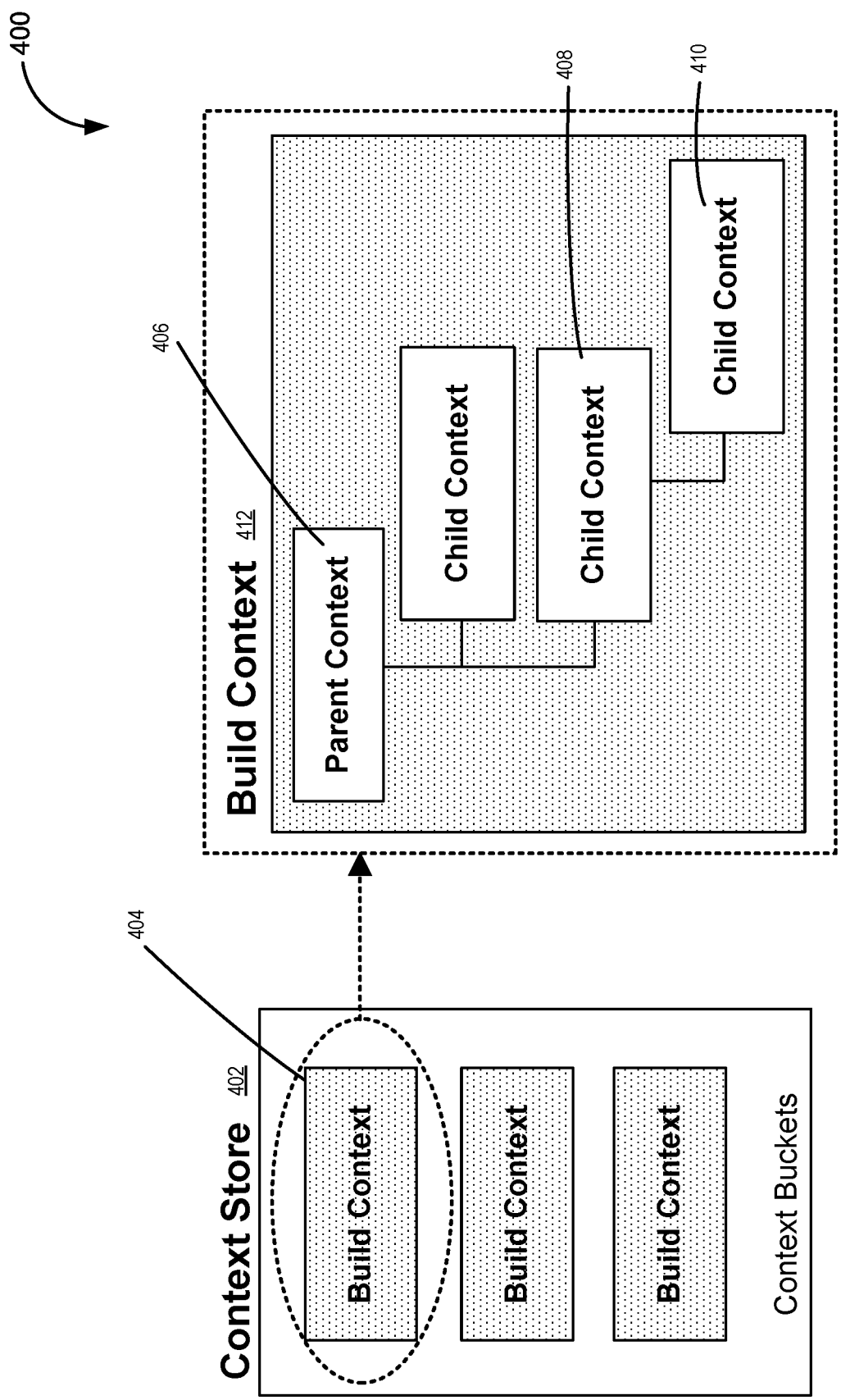
FIG. 4 illustrates a hierarchy of build contexts, in accordance with embodiments of the present disclosure.

FIG. 4 illustrates a hierarchy 400 of build contexts, in accordance with embodiments of the present disclosure. A build context is a way to pass information down a build pipeline. A build context can be thought of as a loosely typed container (analogous to a "bucket") of objects that are passed through the pipeline from one build to next, always flowing downstream through the build pipeline. Each task gets its own copy, which it can modify and pass on to the next task. As a result, the individual tasks can be isolated from other steps in the same build pipeline, from other instances of the pipeline (e.g., running in parallel), and/or from other build pipelines, which may execute in the same build cluster topology concurrently. Typically, the objects in the bucket can accumulate as the execution proceeds through the pipeline.

As a result, the data input and output by each task in the build pipeline can be encapsulated, and the build context can carry, organize, and isolate data for each task. Accordingly, the build pipeline may be parallelized, duplicated, and/or virtualized securely and automatically.

In this example, a context store 402, such as context store 310 in the example of FIG. 3, can store records of individual build contexts output by each node. Context store 402 may store multiple build contexts, which may be results from separate pipelines and/or pipeline instances. Each individual build context record stored by context store 402 can contain a hierarchy of build contexts output by all the tasks in the build pipeline. For example, build context archive 404 can contain parent build context 406 and child build context 408. There can be multiple levels or generations of build contexts, for example child build context 410 is a child of child build context 408, which in turn is a child of parent build context 406. Each child build context can be a superset of its parent context. For example, child build context 410 can be a superset of child build context 408, which in turn can be a superset of parent build context 406.

A leading step (also referred to as a trigger step) is an initial build step that does not require a build context as input. Accordingly, parent build context 406 can originate from the pipeline initiation action, such as user input or an automated process (e.g., a Git commit event). In an embodiment, the parent build context of the leading step can be automatically generated using values from such a pipeline initiation action, also referred to as a trigger event. The child build contexts are appended when tasks are executed and passed as input to the task down the line. In an embodiment, child build context 408 can effectively include any content unchanged from parent build context 406. For example, any lookup in child build context 408 can see the entire lookup hierarchy 412. In an example, lookup hierarchy 412 provides an aggregate merged view including any new or modified values included in child build context 408, as well as any unchanged values from parent build context 406.

In an embodiment, any lookup in a child build context, such as child build context 410, can see an aggregate merged view of the values in the child 410, as well as all of its parents 406 and 408. In some embodiments, the child build context 410 may contain a copy of the data in the parent build contexts. In other embodiments, child build context 410 may instead have a symbolic link to the parent build context's data, or other functionality that enables it to access this data as if it owned the data, without actually needing to contain a copy of the parent build context's data. In an embodiment, this parent build context data may actually be located at the context store.

A terminal step can be a final build step in the build pipeline that archives or discards the build context, but does not produce one. The entire intermediate build context can be stored in context store 402, and can be made available to the appropriate executor where the tasks are executed, through the proposed mechanism.

In embodiments, the disclosed build context provides isolation and modularity, such that individual build steps need not manage or track how the build context is transferred among separate build workers or steps, or where the build context resides. The build context is made available to each build step before it begins execution, and the child build context each step produces is captured after it finishes execution. Moreover, the disclosed build context is highly flexible and decentralized, providing natural parallelizability.

The build context disclosed herein can improve over concepts such as reusable build steps and managing input/output flow. In embodiments of the disclosed system, the build context can provide an encapsulated container (analogous to a "bucket") around a respective build step, and propagate the container through the pipeline non-destructively. In an embodiment, each step has read-write local access, not just to its own context, but also has read access to the context of all preceding steps. In an embodiment, the build context can be used to record intermediate results, which can include artifacts that must be passed from one step to another. The stored build contexts from intermediate build steps can be subsequently inspected, e.g. for debugging purposes. In an embodiment, each step can access a directed graph of all the steps that executed prior to the current step.

As a result, the disclosed build context improves over conventional systems by freeing a user from needing to handle concurrency, storage, and synchronicity of the steps. Accordingly, the build steps can span a pipeline across computing node and can span time periods, with pauses in between.

The objects in a build context can be key-value pairs, and each key can be unique. In an embodiment, there are five types of objects: Boolean, Integer, String, File, and Collection. Collection can be a list of strings. In an embodiment, the dot (.) is a reserved character, used to delimit namespaces within a key. The namespace 'refs' is also reserved.

For example:
weblogic.deployment.applicationName=<String:"application1">
weblogic.deployment.applicationZip=<File: application.war>
weblogic.deployment.useSSL=true
weblogic.deployment.username=rovarghe
weblogic.deployment.targets=<Collection: "cluster1", "managedServer1", "adminServer">

In this example, the build context includes deployment information about the application. Specifically, the application's name, denoted by weblogic.deployment.applicationName, is "application1." The build context further denotes a web archive, or WAR file, as the deployed application, specifies that SSL should be used to deploy the application, specifies that user rovarghe has permission to deploy the application, and specifies "cluster1," "managedServer1," and "adminServer" as deployment targets.

A build step cannot hide or remove any keys already in the context. It can replace a value with the same type, or create a new key-value pair. When a join occurs (i.e., when a step combines results from two or more upstream steps, as in FIG. 1B, and uses them both as input), the build context received by the subsequent build step can be a union of all the keys of all the upstream steps.

In an embodiment, there is a local way to access contents of the build context, which is accessible as a Java API for Build Plugins and a CLI for shell scripts. For example, the system may provide a command line build context interface, such as the command "bc" in the following example code used to inspect and edit values of a build context:

$ bc getfile "weblogic.deployment.applicationZip">application1.zip
$ bc getstring "weblogic.deployment.applicationName"
application 1
$ bc getbool weblogic.deployment.useSSL
true
$ bc getcollection "weblogic.deployment.targets"
cluster1
managerServer1
adminServer
$ bc keys "weblogic.deployment"
weblogic.deployment.applicationName: String
weblogic.deployment.applicationZip:File
weblogic.deployment.useSSL:Boolean
weblogic.deployment.username:String
weblogic.deployment.targets:Collection
$ bc keys "weblogic.deployment.target"
weblogic.deployment.targets.0:String
weblogic.deployment.targets.1:String
weblogic.deployment.targets.2:String
$ bc getinteger weblogic.deployment.username
Error: Type mismatch, value is String
$ bc getbool dummy.key
Error: Key not found 'dummy.key'
$ bc putstring "weblogic.deployment.applicationName" "application2"
$ bc append weblogic.deployment.targets "managedServer2"
$ bc assert "weblogic.deployment.applicationName"
$ bc assert "weblogic.deployment.applicationName:Integer"
Error: Type mismatch, value is String For consistency and integrity of the artifacts produced by a build pipeline, it is important that the build pipeline itself function as an insulated channel as free of external influences as possible. When using the disclosed build context as the exclusive way inputs can be entered into a build step, a user can easily debug the build step by examining the contents of the build context before and after the step. In various embodiments, this can be done as a "post-mortem" after a pipeline or step has failed, or even while the pipeline is still executing. In an embodiment, it is possible to examine the build contexts of various build instances proceeding through the pipeline at any point in time. In some examples, this can be done at any time by inspecting stored build contexts in the context store. Furthermore, in some embodiments, the terminal build step can be configured to operate in a debug mode, in which it can archive each build context upon completion.

Maven Project Build and Deploy to Java Container

A typical usage example of the disclosed system is a pipeline that can automatically check out source code from a Git repository, build the source using a build automation tool such as Apache Maven, run unit tests and integration tests on the build, and deploy it to a Weblogic (JEE) container. Table 1 shows the tasks in this example pipeline.

TABLE 1

| # | Task Title | Input | Task Description | Output |
|---|---|---|---|---|
| 1 | Checkout from GIT repo | Repository (repo) URL, Repo Credentials, Workspace Directory | Checks out source from GIT repository | Local Source File System, Git Root |
| 2 | Run Maven Build | Local Source File System, Git Root, Additional Maven Build Parameters | Runs Maven with the build goal that produces a WAR file | WAR File |
| 3 | Unit Tests | Local File System, Git Root, Additional Maven Test Parameters | Runs Maven with the test goal that runs JUnit tests | Test Reports |
| 4 | Deploy | WAR File, Target Server, Server Credentials | Run wldeploy to deploy the WAR artifact to a Weblogic container | Deployment Log, Application URL |

In this example, the build context could initiate as an empty hashmap. Since all the inputs and outputs for each task are known in advance, in this example, the system can prompt a user for any missing inputs. In particular, a static analysis of the pipeline shows the following inputs are missing and need to be provided by the user: Repo URL; Repo Credentials Workspace Directory; Additional Maven Build Parameters Additional Maven Test Parameters Target Server; and Server Credentials.

Next, an initial build context is constructed and the values entered by the user are populated. For example, the build context may look like this:
 trigger.source="user: john.doe"
 git.repo.url="http://example.com/git/repositories/foo.git"
 git.repo.credentials=<encrypted username, password>
 workspace.directory="/home/builder/workspace1"
 maven.build.additional.parameters="-v"
 maven.test.additional.parameters="-Dlogging.info=DEBUG"
 deployment.server.url="http://example.com/acme/weblogic/cluster1/admin"
 deployment.server.credentials=<encrypted username, password>

In this example, the user "john.doe" has triggered the build pipeline, which can proceed to check out the source code from a Git repository located at the URL http://example.com/git/repositories/foo.git. The build context also can store the credentials needed to access the Git repository, such as a username and password, as well as the filesystem directory for the build workspace, parameters (such as command-line flags) for Maven build and test steps, and a URL and credentials for a deployment server.

Next, the build context is passed to the first task, which can read the relevant inputs, git.repo.url, git.repo.credentials, and workspace.directory, from the received build context, and can start cloning the source from Git. On completion, the task can create a new build context as a child of the build context that was passed in, similar to child build context 408, which is a child of parent build context 406, in the example of FIG. 4. In this example, the child context has only two new values, a flag indicating that the build will take place in the local filesystem and a local path for the build, based on the output of the cloning step:
 build.local.file.system=true
 git.root="/home/builder/workspace1/foo"

However, since the new context is a child build context, it can effectively include a copy of its parent build context as part of a lookup hierarchy. For example, any lookup in the child build context can see an aggregate merged view of the values in the child, as well as its parent. In some embodiments, the child build context may contain a copy of the data in the parent build context. In other embodiments, the child build context may instead have a symbolic link to the parent build context's data, or other functionality that enables it to access this data of the as if it owned the data, without actually needing to contain a copy of the parent build context's data. In an embodiment, this parent build context data may actually be located at the context store.

Next, the new context is passed to the "run Maven build" task. The "run Maven build" task can use a continuous deployment or build automation tool, such as Maven, to build the application from the cloned source. In this example, the source is built to a web archive, or WAR file. In this example, the "run Maven build" task receives the entire child build context, but it does not need all the data in this build context (for example, data relating to the Git repository) in order to perform the local build. Instead, the build task needs the flag indicating that the build will take place in the local filesystem, the local path for the build, and any additional parameters passed to the build automation tool (in this example, Maven) to carry out the build. Accordingly, the "run Maven build" task can read the following values, and proceeds to perform a full Java-based build:
 build.local.file.system
 git.root
 maven.build.additional.parameters When the "run Maven build" step finishes, a new child build context is created, similar to child build context 410 in the example of FIG. 4, which is a child of child build context 408, which in turn is a child of parent build context 406. The new child build context's parent is the context passed into the "run Maven build" step. This new context can effectively include a copy of all of the data in its parent build context, and can further add the following web archive, or WAR, output from the "run Maven build" step:
 build.output.war.file=<binary war file>

Since the values for build.local.file.system and git.root are not changed by the "run Maven build" task, the new context need not include copies of them. However, these values can be available for inspection by virtue of the lookup hierarchy, as child context 408 can access the entire lookup hierarchy 412 in the example of FIG. 4.

The next task, "unit tests," takes its input from the build context, which is passed to the build step as input. In this example, this build step may choose to publish results of the unit test to a remote location. The URL to the location is added to a new child build context that the "unit tests" task creates:

test.output.url="http://example.com/pipelines/test/output/E5F3210F24Hi2"

The task can then pass the build context to the final "deploy" task. At this point, the entire build context looks like this:

```
trigger.source = "user: john.doe"
git.repo.url = "http://example.com/git/repositories/foo.git"
git.repo.credentials=<encrypted username, password>
workspace.directory= "/home/builder/workspace1"
maven.build.additional.parameters = "-v"
maventest.additional.parameters = "-Dlogging.info=DEBUG"
deployment.server.url = "http://example.com/acme/weblogic/cluster1/admin"
deployment.server.credentials = <encrypted username, password>
    build.local.file.system=true
    git.root = "/home/builder/foo"
        build.output.war.file = <binary war file>
            test.output.url = "http://example/com/pipelines/test/output/ESF32104F24Hi2"
```

In this example, as in the example of FIG. 4, the generations of build contexts are indented to show hierarchy. The "deploy" task receives enough information in the build context to perform its work. Because the WAR file is encapsulated within the context, there is no danger of another parallel job having overwritten or modified the WAR file while the build pipeline was executing the "unit test" task. In general, the pipeline's execution is unaffected by other build jobs that may initiate using the same pipeline after a first job or pipeline instance is initiated by the user.

Automatic Trigger Via Git Commit

In another example, the pipeline can be triggered by a version control commit event (e.g., on Git), without requiring user input. In this case, similar to the user-initiated trigger example described above, the build context can start out as an empty hashmap. The triggering event supplies, at minimum, the following parameters to perform the Git commit:

trigger.source="git: commit AE243CFFB30591C3144512CD304"

git.repo.url="http://example.com/git/repositories/foo.git"

git.repo.credentials=<authorization token>

In this example, the parameters include an identifier of a Git commit event that triggers the build, a URL for the Git repository, the credentials needed to access the Git repository, such as an authorization token.

Values for the other context keys, such as deployment.server.url, deployment.server.credentials, etc., cannot be supplied by this event. Thus, in this example, if default values for these context keys are available, the system uses the default values. In an embodiment, if no default values have been defined for such context keys as part of the task definition, the pipeline will not start.

In an example, the build can then proceed as in the previous example. Specifically, the remaining steps in the pipeline may be the same as steps 2 through 4 of the example of Table 1. In an embodiment, the same build pipeline can either be triggered by a user (as in the previous example), or automatically by a version commit (as in this example), and can then proceed similarly in either case. In a typical example, the final build context may be similar to that of the previous example, but with the entries of the parent context replaced by the values described here.

Maven Project Build and Deploy to Java Container with Fork for Integration Test and Approval Workflow In another example, a fork, like fork 152 in FIG. 1B, can be introduced into the build pipeline after the unit test task. In this example, one branch of the fork leads to an "integration test" task, while another leads to an "approval" task. The pipeline joins the execution from these two tasks, and can wait until both are complete before running the "deploy" task. Because the "approval" task requires human interaction, the build pipeline can effectively be suspended indefinitely until a user signals approval. Accordingly, the tasks in the pipeline are as shown in Table 2.

TABLE 2

| # | Task Title | Input | Task Description | Output |
|---|---|---|---|---|
| 1 | Checkout from GIT repo | Repo URL, Repo Credentials | Checks out source from GIT repository | Local Source File System, Workspace |
| 2 | Run Maven Build | Local Source File System, Workspace Directory, Additional Maven Build Parameters | Runs Maven with the build goal that produces a WAR file | War File |
| 3 | Unit Tests | Local File System, Workspace Directory, Additional Maven Test Parameters | Runs Maven with the test goal that runs JUnit tests | JUnit Test Reports |
| 4a | Integration Tests | WAR File | Deploys and Tests War File in a Stage Environment | Integration Test Results |
| 4b | Human Approval | JUnit Test Reports | Offline workflow task, suspends pipeline until approval is received | Approval |
| 5 | Deploy | WAR File, Target Server, Server Credentials | Run wldeploy to deploy the WAR artifact to a Weblogic container | Deployment Log, Application URL |

The first three tasks are identical to the previous example, as is the fifth "deploy" task. This illustrates the reusability of modular tasks in the build pipeline with the disclosed build context. In particular, these four tasks can be dropped into this pipeline without any change, as they can execute based entirely on the input and outputs in the build context.

After "unit tests" (task #3) is executed, the build pipeline forks and executes "integration tests" (task #4a) and "human approval" (task #4b) simultaneously. In various embodiments, the steps following a fork can execute on the same build worker or on different workers, in parallel, or sequentially. The build contexts received by both of these tasks may be identical:

```
trigger.source = "user: john.doe"
git.repo.url = "http://example.com/git/repositories/foo.git"
git.repo.credentials=<encrypted username, password>
workspace.directory= "/home/builder/workspace1"
maven.build.additional.parameters = "-v"
maven.test.additional.parameters = "-Dlogging.info=DEBUG"
deployment.server.url = "http://example.com/acme/weblogic/cluster1/admin"
deployment.server.credentials = <encrypted username, password>
    build.local.file.system=true
    git.root = "/home/builder/foo"
        build.output.war.file = <binary war file>
            test.output.url = "http://example.com/pipelines/test/output/E5F32104F24Hi2"
```

In this example, as in the example of FIG. 4, the generations of build contexts have been indented to show hierarchy. Moreover, the build context is similar to the build contexts of the previous examples. In particular, it includes information related to the source code checkout via Git, the local build, the deployment server, and the output WAR file.

However, in this example, the build pipeline can then fork into separate branches for the "integration tests" and "human approval" tasks. In an embodiment, the forked pipeline may produce different, parallel child build contexts along the branches of the fork. Accordingly, the system can merge the parallel child contexts after all the branches execute. In an embodiment, the system merges the parallel child contexts upon joining the branches.

Similar to the previous examples, the "integration tests" task inserts its output into the build context as a child context. In this example, the "integration tests" task can output integration-test.output.url in the child context, which can provide a URL location of the results of the integration tests.

. . .

```
build.output.war.file = <binary war file>
    test.output.url = "http://example.com/pipelines/test/output/E5F32104F24Hi2"
        integration-test.output.url =
        "http://example.com/pipelines/integration/output/aHdF920"
```

The "human approval" task may require suspending the build pipeline, and may resume after any period of time. After executing, the "human approval" task may add several more entries to the build context:

. . .

```
build.output.war.file = <binary war file>
    test.output.url = "http://example.com/pipelines/test/output/E5F32104F24Hi2"
        approval.user = "john.doe"
        approval.status = "approved"
```

When both of these tasks are complete, the pipeline resumes with a fan-in or join, and merges the two child contexts into a single one, while keeping the same immutable parent build contexts:

```
trigger.source = "user: john.doe"
git.repo.url = "http://example.com/git/repositories/foo.git"
git.repo.credentials=<encrypted username, password>
workspace.directory= "/home/builder/workspace1"
maven.build.additional.parameters = "-v"
maven.test.additional.parameters = "-Dlogging.info=DEBUG"
deployment.server.url = "http://example.com/acme/weblogic/cluster1/admin"
deployment.server.credentials = <encrypted username, password>
    build.local.file.system=true
    git.root = "/home/builder/foo"
        build.output.war.file = <binary war file>
```

```
test.output.url = "http://example.com/pipelines/test/output/E5F3210F24Hi2"
    approval.user = "john.doe"
    approval.status = "approved"
    integration-test.output.url =
    "http://example.com/pipelines/integration/output/aHdF920"
```

This merged context is then passed to the "deploy" task, which is able to perform the deployment using the values in the build context. As noted above, the "deploy" task can be agnostic of the fact that additional work has been performed in the pipeline prior to its invocation. This facilitates modular reuse of the task in multiple build pipelines. The "deploy" task can be executed after several hours, or even days. Because the build context encapsulates all of the information needed for this task to operate, there is no danger of another build traversing through the pipeline interfering with this particular instance.

Figure 5:
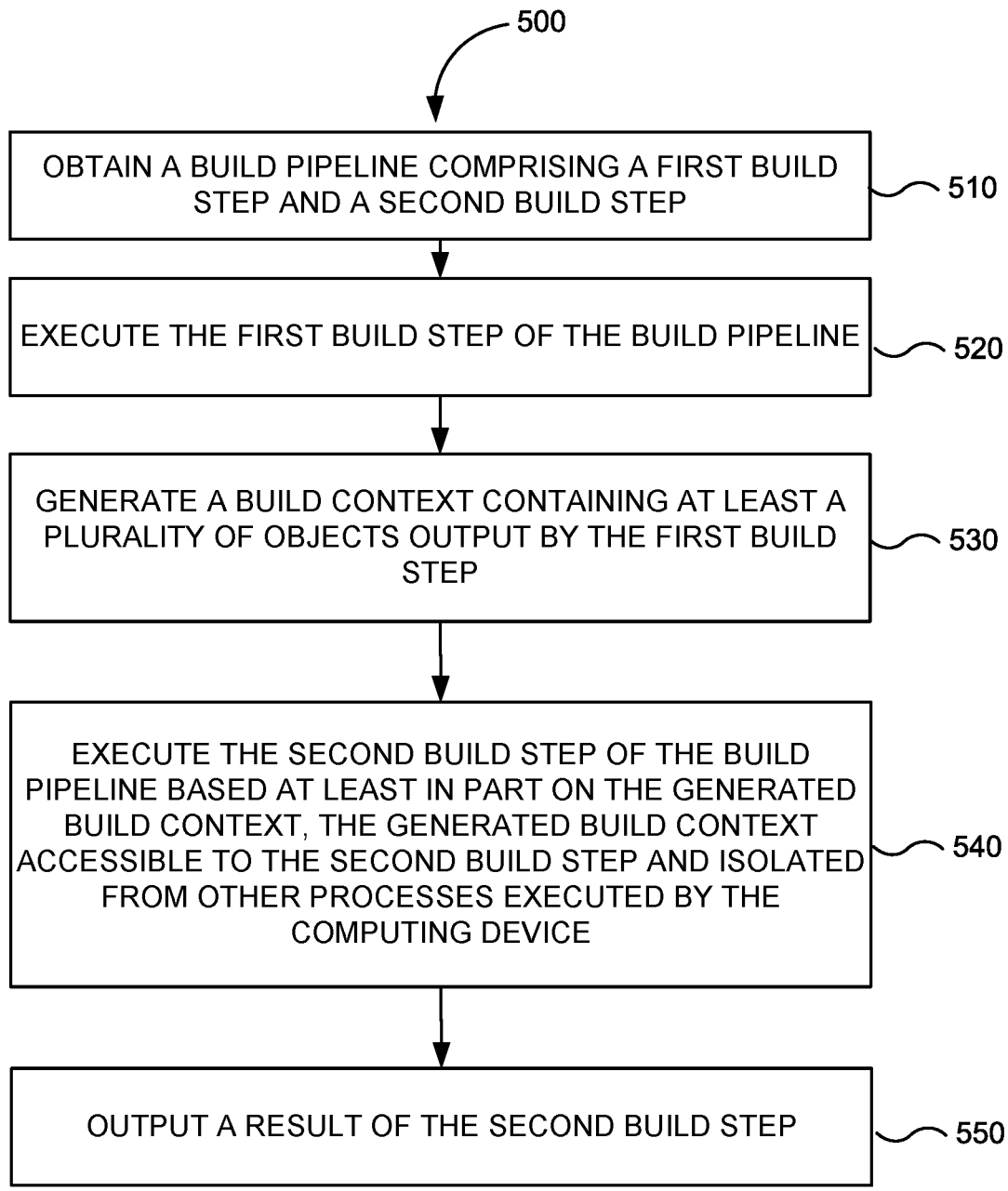
FIG. 5 is a flow diagram of a method for isolating a build pipeline, in accordance with embodiments of the present disclosure.

FIG. 5 is a flow diagram of a method 500 for isolating a build pipeline, in accordance with embodiments of the present disclosure. In an exemplary embodiment, method 500 can be implemented by a build topology such as build cluster topology 200 in the example of FIG. 2, or the build topology shown in the example of FIG. 3, and/or by a computing device associated with such a build topology. The build topology may include physical servers, build workers, VMs, and/or containers allowing multiple VMs per node. All of these may be referred to generically herein as computing devices. In an embodiment, the build topology may further include a pipeline executor that can manage the build pipeline on the plurality of computing devices. The build topology may further include a context store, such as context store 310 of the example of FIG. 3 or context store 402 of the example of FIG. 4. The context store may be configured to store copies of some or all of the build contexts generated during execution of the build steps of the build pipeline.

In operation 510, the system can receive a build pipeline comprising at least a first build step and a second build step. In various embodiments, the system may execute the first and second build steps serially on a single computing device, or may execute them in parallel on one or more computing devices. In various embodiments, the build pipeline may contain any number of build steps, and is not limited by the present disclosure. In some embodiments, the first build step may be an initial build step of the build pipeline. The initial build step may begin in response to a trigger event, such as user input or an automated process (e.g., a Git commit event). Alternatively, the first build step may be based at least in part on a parent build context obtained by the computing device, for example, from an earlier build step.

In operation 520, the system executes the first build step of the build pipeline. For example, a first computing device of the build topology may execute the first build step. In an embodiment, a build context may initiate as an empty hashmap, and may be generated in response to a trigger event. In some embodiments, a build context may subsequently be constructed using default values, values supplied by a user, and/or values automatically populated by the system.

In operation 530, the system generates, based at least in part on the first build step, a build context containing at least a plurality of objects output by the first build step. In an embodiment, the generated build context may be based on a previously initiated build context, such as an empty build context, a parent build context, or a build context received from another task. In the case of a parent build context, the parent build context may include a subset of the plurality of objects, and the build context generated in operation 530 may effectively include a copy of the parent build context as part of a lookup hierarchy. The system can generate the new build context including output from the first build step. In an embodiment, the build context may include boolean objects, integers, string, file objects, and/or collections of strings.

In operation 540, the system executes the second build step of the build pipeline based at least in part on the generated build context. The generated build context may be accessible to the second build step and isolated from other processes executed by the computing device. In an embodiment, the system can instead execute the second build step on a second device, such as a second build worker in the same build topology, or another cluster, as will be described in the example of FIG. 6A, and is not limited by the present disclosure. In an embodiment, a third computing device of the plurality of computing devices is configured to execute a parallel copy of the first build step.

In an example, when the first build step completes execution, the system can immediately execute another instance of the same step using a new build context for a separate build pipeline instance, even while the second step executes based on the build context generated in operation 530 (or a child build context thereof). Because of the encapsulation provided by the disclosed build contexts, these two steps can execute on a single node or computing device (for example, a single physical machine) without overwriting or interfering with each other.

In operation 550, the system outputs a result of the second build step. The system can generate, based on the second build step, a child build context containing a second plurality of objects. The child build context may effectively include a copy of the build context generated in operation 530 as part of a lookup hierarchy. The child build context may include objects that are modifications of objects included in the build context generated in operation 530. The child build context may further include new objects output by the second build step.

In an embodiment, the second build step may be a terminal step. Such a terminal step may not generate a build context.

Alternatively, in various embodiments, the build pipeline may contain any number of build steps, and is not limited by the present disclosure. For example, a second computing device may receive the child build context and execute a third build step of the build pipeline based on the received child build context, as in the example of FIG. 6A below. In an embodiment, the system can execute multiple instances of build steps of the build pipeline in parallel, such as the first build step. The generated build context accessible to the second build step can further be isolated from such additional instances of build steps. In an embodiment, a third computing device is configured to load a build context from the context store and execute a subsequent build step of the build pipeline.

Figure 6A:
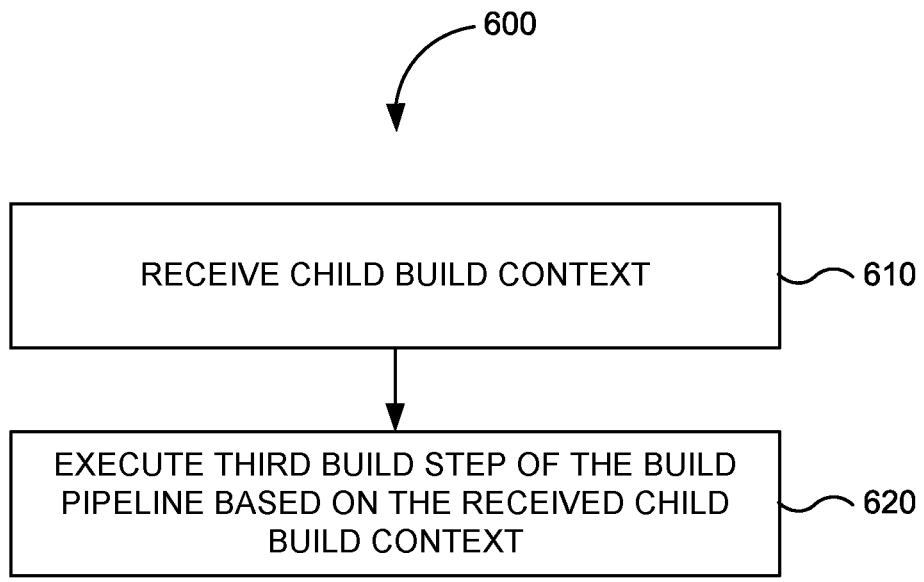
FIG. 6A is a flow diagram of a method for distributing an isolated build pipeline, in accordance with embodiments of the present disclosure.

FIG. 6A is a flow diagram of a method 600 for distributing an isolated build pipeline, in accordance with embodiments of the present disclosure. Method 600 can provide further detail on distributed execution of operation 540 of the example of FIG. 5. In various exemplary embodiments, method 600 can be implemented by a build topology such as build cluster topology 200 in the example of FIG. 2, or build pipeline 300 in the example of FIG. 3, and/or by a computing device associated with such a build topology. In operation 600, the system receives a child build context. The received child build context may be based on output of another build step, such as in method 500 in the example of FIG. 5. In an embodiment, the child build context may be received from another computing device, for example another build worker in the same build topology. In an embodiment, the child build context may be received from another cluster and/or from a storage device. In operation 610, the system executes a third build step of the build pipeline based on the received child build context. In various embodiments, the third build step can be executed in parallel or sequentially with other build steps, such as the first and/or second build steps of the example of FIG. 5. In an embodiment, a third computing device is configured to execute the third build step of the pipeline in parallel with a second computing device executing the second build step.

Figure 6B:
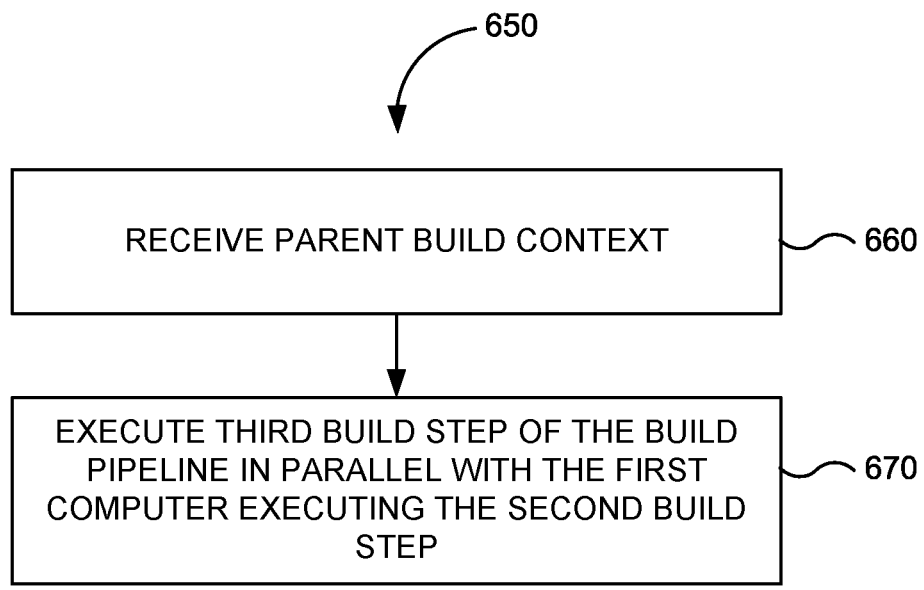
FIG. 6B is a flow diagram of a method for distributing a build step in an isolated build pipeline, in accordance with embodiments of the present disclosure.

FIG. 6B is a flow diagram of a method 650 for distributing a build step in an isolated build pipeline, in accordance with embodiments of the present disclosure. In various exemplary embodiments, method 650 can be implemented by a build topology such as build cluster topology 200 in the example of FIG. 2, or build pipeline 300 in the example of FIG. 3, and/or by a computing device associated with such a build topology. In operation 660, the system receives a parent build context. The received parent build context may be based on output of another build step, such as in method 500 in the example of FIG. 5. In operation 670, the system executes a third build step of the build pipeline in parallel with another computing device executing the second build step, such as another build worker in the same build cluster topology executing the second build step of the example of FIG. 5. In an embodiment, the second build step may be executed by a second build worker in parallel with a first build worker executing the first build step, and the third build step may be executed by a third build worker.

Figure 7:
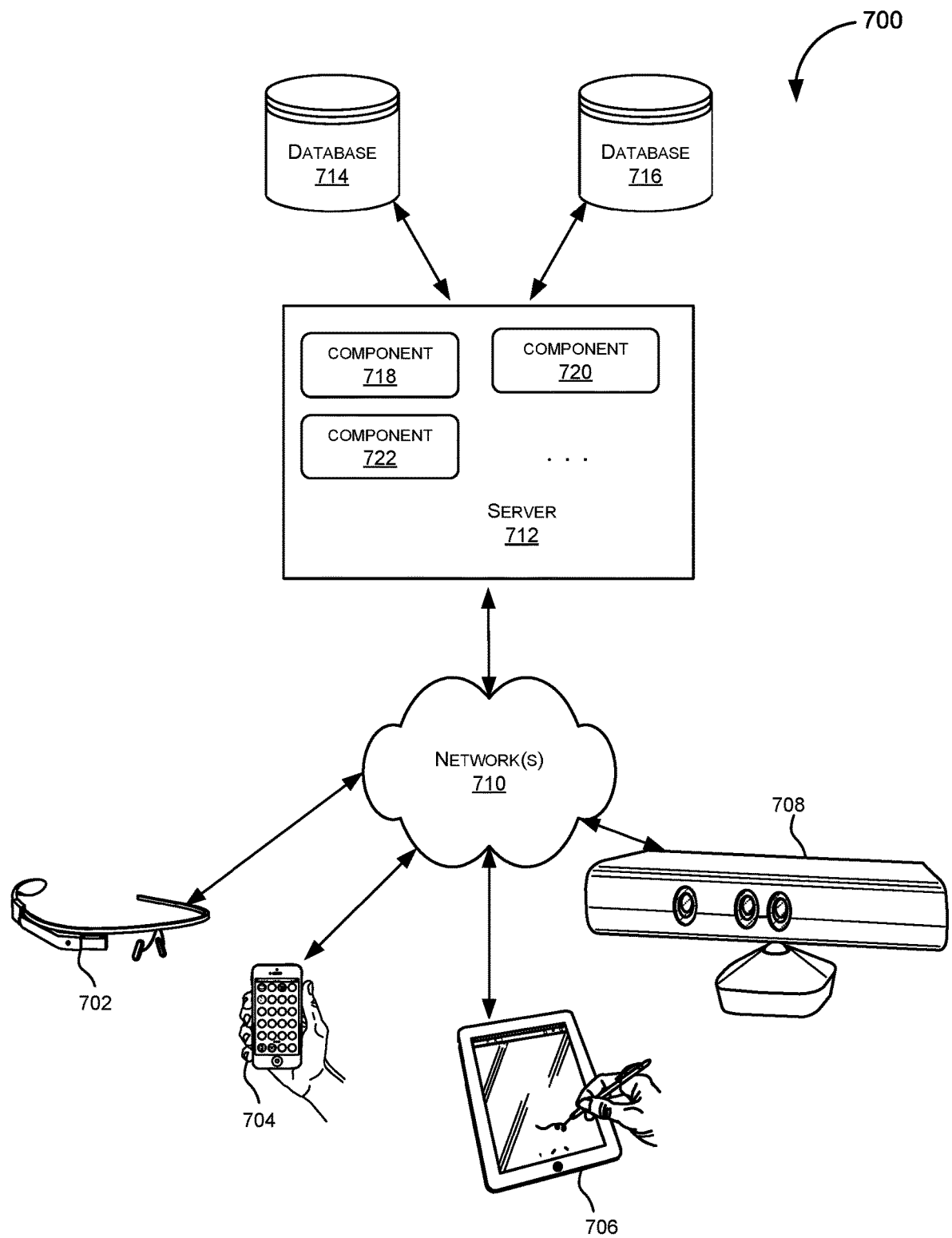
FIG. 7 depicts a simplified diagram of a distributed system for implementing an embodiment of the present disclosure.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client-computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
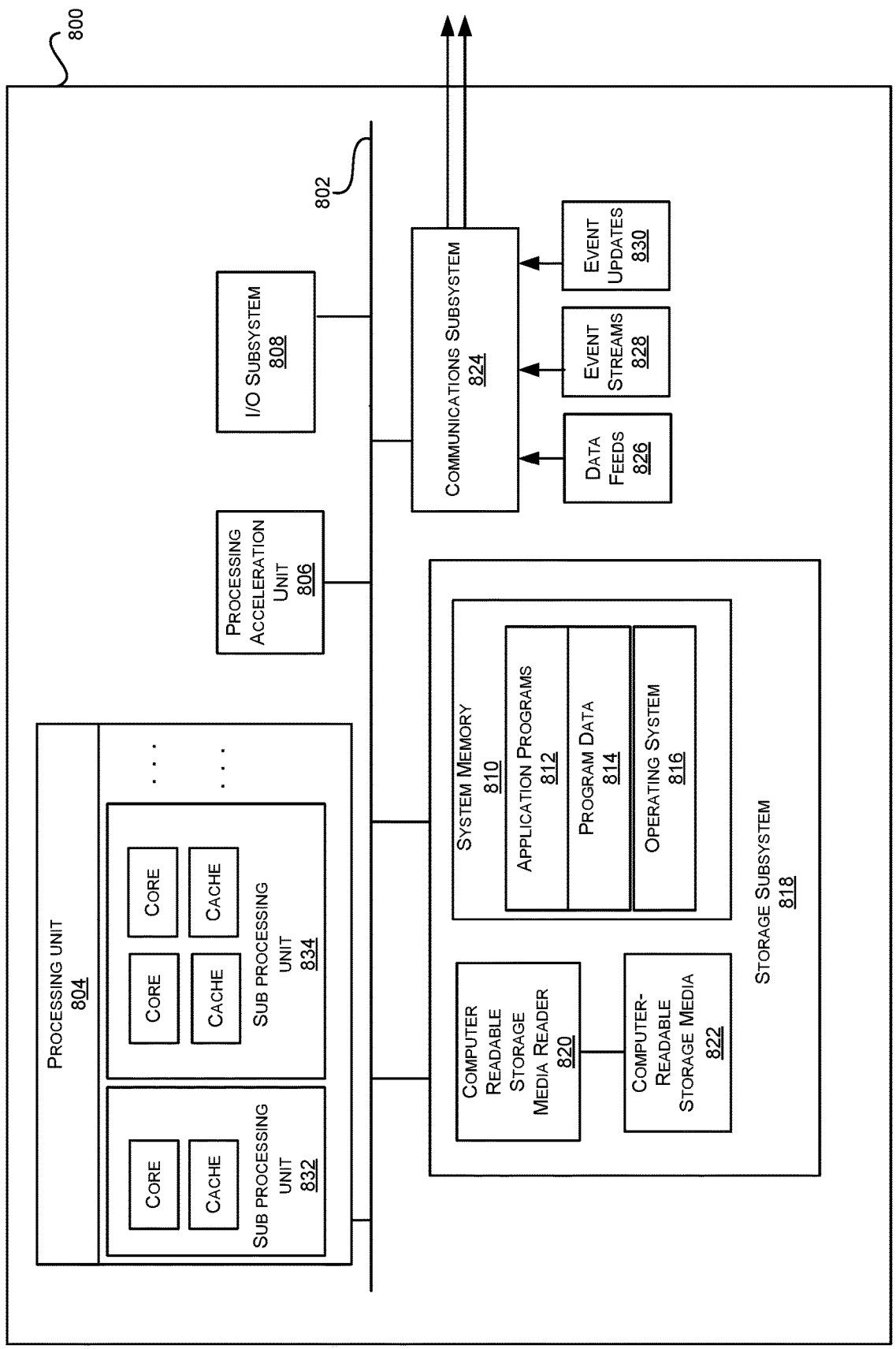
FIG. 8 is a simplified block diagram of one or more components of a system environment by which services provided by one or more components of an embodiment system may be offered as cloud services, in accordance with an embodiment of the present disclosure.

FIG. 8 illustrates an exemplary computer system 800, in which various embodiments of the present disclosure may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818, and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 7 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 9:
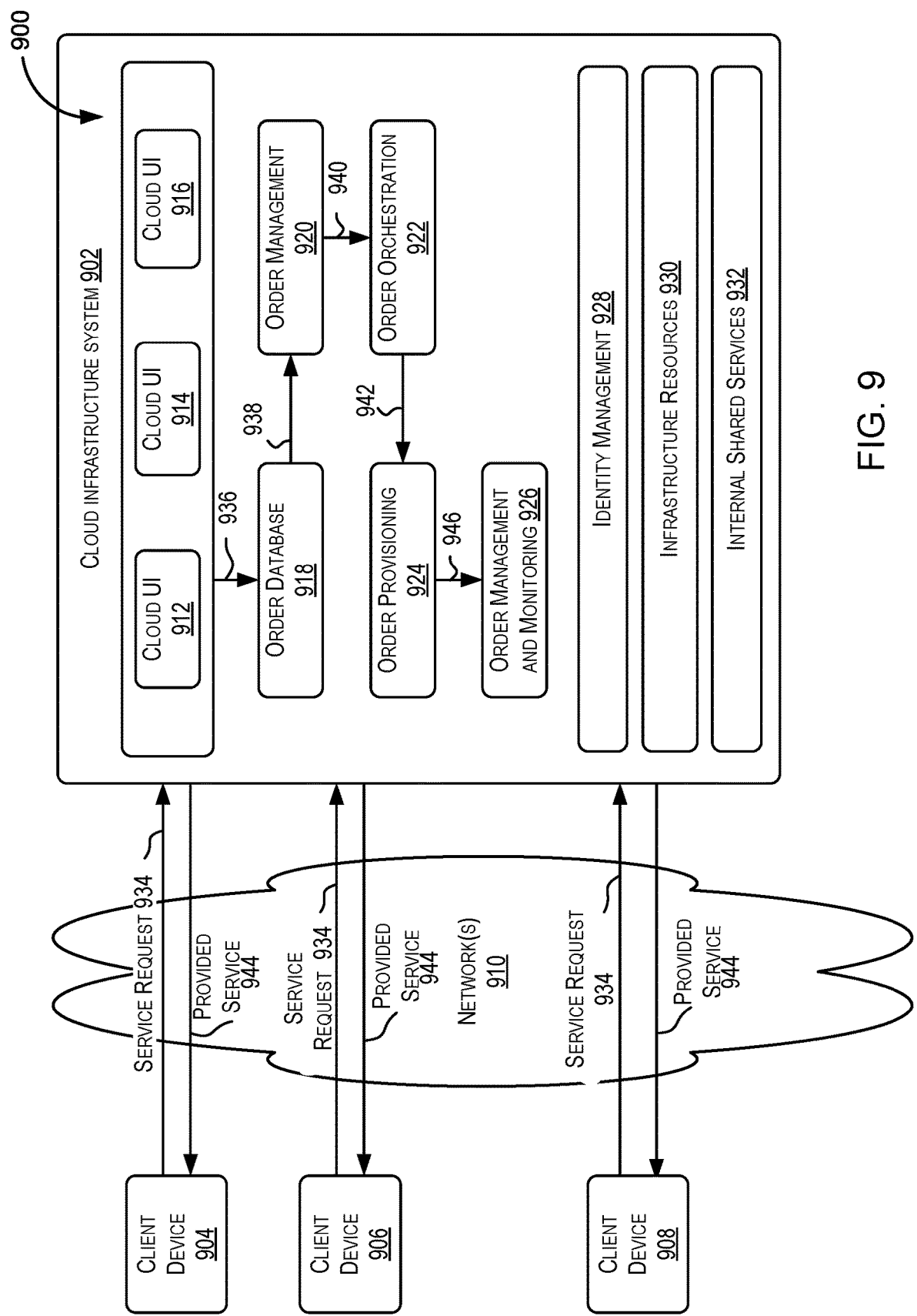
FIG. 9 illustrates an example computer system that may be used to implement an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the disclosure. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 702, 704, 706, and 708.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 1610.

Cloud infrastructure system 902 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for encapsulating data of a build pipeline, the method comprising:
   determining, by a first computing device of a plurality of computing devices, an identifier of a version commit event;
   obtaining, by the first computing device and from a pipeline executor based at least in part on determining the identifier of the version commit event, the build pipeline having a plurality of build steps including at least a first build step and a second build step;
   executing, by the first computing device, the first build step of the build pipeline to access plurality of objects from a repository, the plurality of objects accessed based at least in part on the identifier of the version commit event;
   generating, by the first computing device and based at least in part on the first build step, a parent build context containing at least a first plurality of objects comprising an output by the first build step, a first object of the plurality of objects comprising a local source file system from the repository;
   executing, by a second computing device of the plurality of computing devices, the second build step of the build pipeline based at least in part on the local source file system;
   generating, by the second computing device and based at least in part on the second build step, a child build context containing at least a second plurality of objects comprising an output by the second build step, an object of the second plurality of objects comprising a web application resource (WAR) file;
   executing, by a third computing device, a third build step of the build pipeline to test the WAR file based at least in part on the child build context;
   executing, by the third computing device, a fourth build step of the build pipeline to receive an approval signal for the WAR file based at least in part on the child build context and in parallel with the third build step; and
   deploying, by the third computing device, the WAR file to a container based at least in part on the third build step and the fourth build step.

2. The method of claim 1, wherein executing the first build step is based at least in part on the parent build context of a build context, the parent build context obtained by the first computing device, and containing at least a first object of the first plurality of objects.

3. The method of claim 2, wherein the first object of the first plurality of objects is received as an input by the first computing device via a user interface.

4. The method of claim 1, further comprising executing a second instance of the first build step of the build pipeline, wherein a second generated build context accessible to the second build step is further isolated from the second instance of the first build step.

5. A system, comprising:
   at least one memory storing computer-executable instructions; and
   a plurality of computing devices access the at least one memory and execute the computer-executable instructions to execute a build pipeline by at least:
   determining, by a first computing device of a plurality of computing devices, an identifier of a version commit event;
   obtaining, by the first computing device and from a pipeline executor based at least in part on determining the identifier of the version commit event, the build pipeline having a plurality of build steps including at least a first build step and a second build step;
   executing, by the first computing device, the first build step of the build pipeline to access a plurality of objects from a repository based at least in part on determining the identifier of the version commit event;
   generating, by the first computing device and based at least in part on the first build step, a parent build context containing at least a first plurality of objects comprising an output by the first build step, a first object of the plurality of objects comprising a local source file system from the repository;
   executing, by a second computing device of the plurality of computing devices, the second build step of the build pipeline based at least in part on the local source file system;
   generating, by the second computing device and based at least in part on the second build step, a child build context containing at least a second plurality of objects comprising an output by the second build step, an object of the second plurality of objects comprising a web application resource (WAR) file;
   executing, by a third computing device, a third build step of the build pipeline to test the WAR file based at least in part on the child build context;
   executing, by the third computing device, a fourth build step of the build pipeline to receive an approval signal for the WAR file based at least in part on the child build context and in parallel with the third build step; and
   deploying, by the third computing device, the WAR file to a container based at least in part on the third build step and the fourth build step.

6. The system of claim 5, wherein the third computing device of the plurality of computing devices is configured to execute a parallel copy of the first build step.

7. The system of claim 5, further comprising: a context store storing a respective copy of a respective build context generated during execution of a respective build step of the build pipeline, wherein the pipeline executor is configured to manage the build pipeline on the plurality of computing devices.

8. The system of claim 7, wherein the third computing device of the plurality of computing devices is configured to load the respective build context from the context store and execute a subsequent build step of the build pipeline.

9. The system of claim 5, wherein the third computing device of the plurality of computing devices is configured to execute the third build step of the build pipeline in parallel with the second computing device executing the second build step.

10. A non-transitory computer-readable medium storing computer-executable instructions that, when executed by one or more processors of a plurality of computing devices, cause the one or more processors to perform operations comprising:
    determining, by a first computing device of a plurality of computing devices, an identifier of a version commit event;
    obtaining, by the first computing device and from a pipeline executor based at least in part on determining the identifier of the version commit event, a build pipeline having a plurality of build steps including at least a first build step and a second build step;
    executing, by the first computing device, the first build step of the build pipeline to access a plurality of objects from a repository, the plurality of objects accessed based at least in part on the identifier of the version commit event;
    generating, by the first computing device and based at least in part on the first build step, a parent build context containing at least a first plurality of objects comprising an output by the first build step, a first object of the plurality of objects comprising a local source file system from the repository;
    executing, by a second computing device of the plurality of computing devices, the second build step of the build pipeline based at least in part on the local source file;
    generating, by the second computing device and based at least in part on the second build step, a child build context containing at least a second plurality of objects comprising an output by the second build step, an object of the second plurality of objects comprising a web application resource (WAR) file;
    executing, a third computing device, a third build step of the build pipeline to test the WAR file based at least in part on the child build context;
    executing, by the third computing device, a fourth build step of the build pipeline to receive an approval signal for the WAR file based at least in part on the child build context and in parallel with the third build step; and
    deploying, by the third computing device, the WAR file to a container based at least in part on the third build step and the fourth build step.

11. The non-transitory computer-readable medium of claim 10, wherein the first plurality of objects includes at least one of: a boolean object, an integer, a string, a file object, or a collection of strings.

12. The non-transitory computer-readable medium of claim 10, wherein the second build step is a terminal step.

13. The non-transitory computer-readable medium of claim 12, wherein the terminal step does not generate a build context.

* * * * *